United States Patent
Yoshiada

[15] 3,651,748
[45] Mar. 28, 1972

[54] CAMERA IRIS BLADE

[72] Inventor: Risaburo Yoshiada, Tokyo-to, Japan

[73] Assignee: Nikon Eigakikai Kabushiki Kaisha (Japan Cine Equipment Mfg. Co., Ltd.), Tokyo-to, Japan

[22] Filed: Dec. 11, 1969

[21] Appl. No.: 884,113

[30] Foreign Application Priority Data
Dec. 13, 1968   Japan..................................43/91899

[52] U.S. Cl. ................................................95/64 R, 352/141
[51] Int. Cl. ............................................................G03b 9/02
[58] Field of Search .........................95/64 R, 64 D; 352/141

[56] References Cited

UNITED STATES PATENTS

| | | | |
|---|---|---|---|
| Re.26,390 | 5/1968 | Vess et al. | 95/64 D |
| 2,297,262 | 9/1942 | Tonnies | 95/64 D |
| 3,099,198 | 7/1963 | Mueller | 95/64 D |
| 3,292,517 | 12/1966 | Eagle et al. | 95/64 D |

FOREIGN PATENTS OR APPLICATIONS 1,431,444   1/1966   France...................................352/141

Primary Examiner—Joseph F. Peters, Jr.
Attorney—William F. Pinsak

[57] ABSTRACT

An iris blade with an integral exposure indicator formed from a sheet of synthetic resin having different colored areas, one color for the indicator and another color for the blade.

1 Claim, 3 Drawing Figures

PATENTED MAR 28 1972  3,651,748
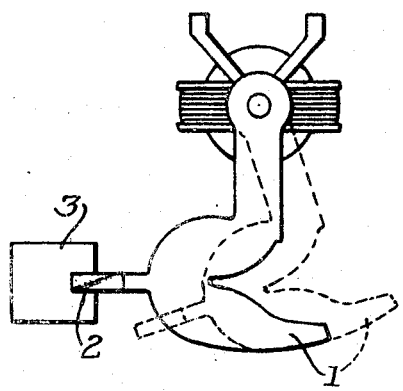
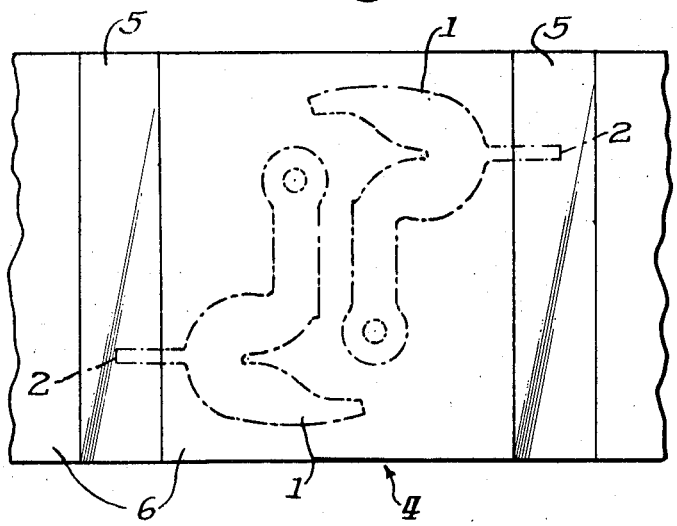
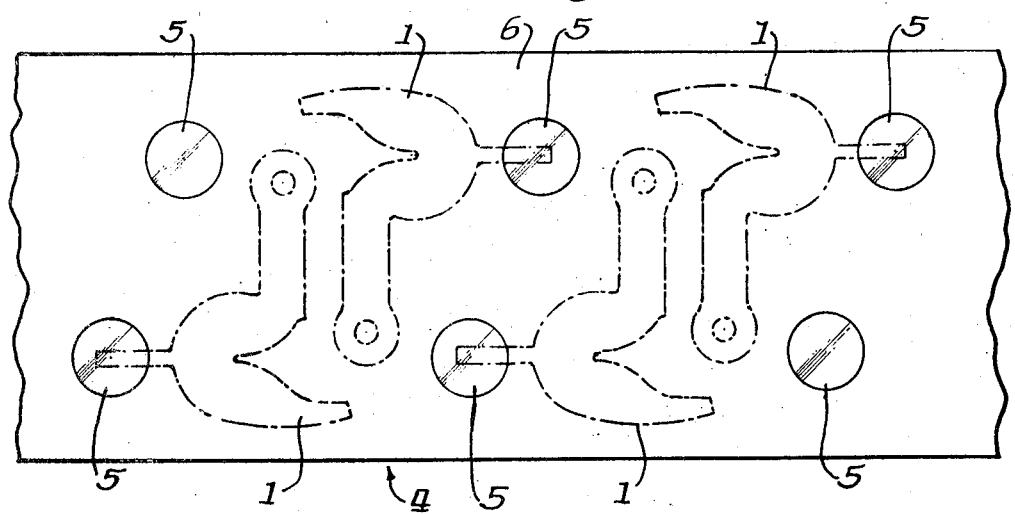
Inventor:
Risaburo Yoshida.
By William F. _____ Atty

CAMERA IRIS BLADE

This invention relates to an iris blade which indicates underexposure or overexposure in a viewfinder of a camera.

Previous camera iris blades having over or underexposure indicators were commonly made by adhesively assembling two separate parts. It is well known in the camera field that an adjustable iris blade is extremely sensitive to a pivotable balance. The two part assembly has a disadvantage in that it is difficult to apply a uniform amount of adhesive to each assembly resulting in an adjustment to balance each iris blade.

Other disadvantages of previous iris blades are due to the blades being commonly made of metal which have weight that creates an inertial error and the metal requires anticorrosion treatment which is costly.

It is an object of this invention to provide a new and improved iris blade for a camera.

It is another object of this invention to provide an iris blade made from a synthetic resin having an over or underexposure indicator formed integral therewith.

It is a further object of this invention to provide an iris blade having a body portion formed from black synthetic resin and having the integral indicator portion formed from red synthetic resin.

Further and other objects will be apparent from the description of the accompanying drawings, in which like parts are designated by like numerals.

In the drawings:

FIG. 1 is a schematic representation of an iris blade according to this disclosure as mounted for movement by a galvanometer relative to an optical path and a viewfinder path of a camera;

FIG. 2 is a plan view showing a synthetic material sheet indicating a non-opaque area and an opaque area and showing an arrangement by which two color iris blades may be formed from the sheet; and FIG. 3 shows an alternate plan view of forming a two color iris blade.

Referring to FIG. 1, an iris blade 1 has a conventionally shaped body portion pivotally supported as in a camera. The body portion is substantially opaque and preferably black in color for blocking out light entering into a camera. The blade 1 has an indicator portion 2 extending integrally from the blade 1. The indicator portion 2 is red in color for a warning signal to be visible through a viewfinder 3. When the indicator portion 2 extends into the viewfinder path, the camera operator is warned of over or underexposure of light for the film.

The iris blade 1 with the indicator 2 are made from the same material by a stamping process as viewed in FIG. 2. A sheet of transparent synthetic resin 4, such as Polycarbonate, is the starting raw material. The entire sheet 4 is first dyed red with an organic-chemical dye forming a red translucent sheet. Intermittent areas 6 along the sheet 4 are then dyed black with an organic-chemical dye leaving strips 5 of red material for the indicator 2. The blade body 1 and indicator portion 2 are stamped out from the sheet 4 thereby providing a two color iris blade formed from the same material.

In FIG. 3 an alternate method of forming the two color synthetic material iris blade is shown. The circles 5 remain red for the indicator 2 while the remaining sheet 4 is dyed black for the body portion of the iris blade 1.

I claim:

1. An iris blade for a camera comprising:
   a body portion stamped from a sheet of non-opaque synthetic resin material having a predetermined color, said body portion being treated to be substantially opaque and a color different from said predetermined color; and
   an indicator portion formed integrally with said body portion from said sheet of synthetic resin material of said predetermined color.

* * * * *